Aug. 11, 1936.    J. W. WHITE    2,050,682
BRAKE ACTUATING MECHANISM
Filed July 30, 1934
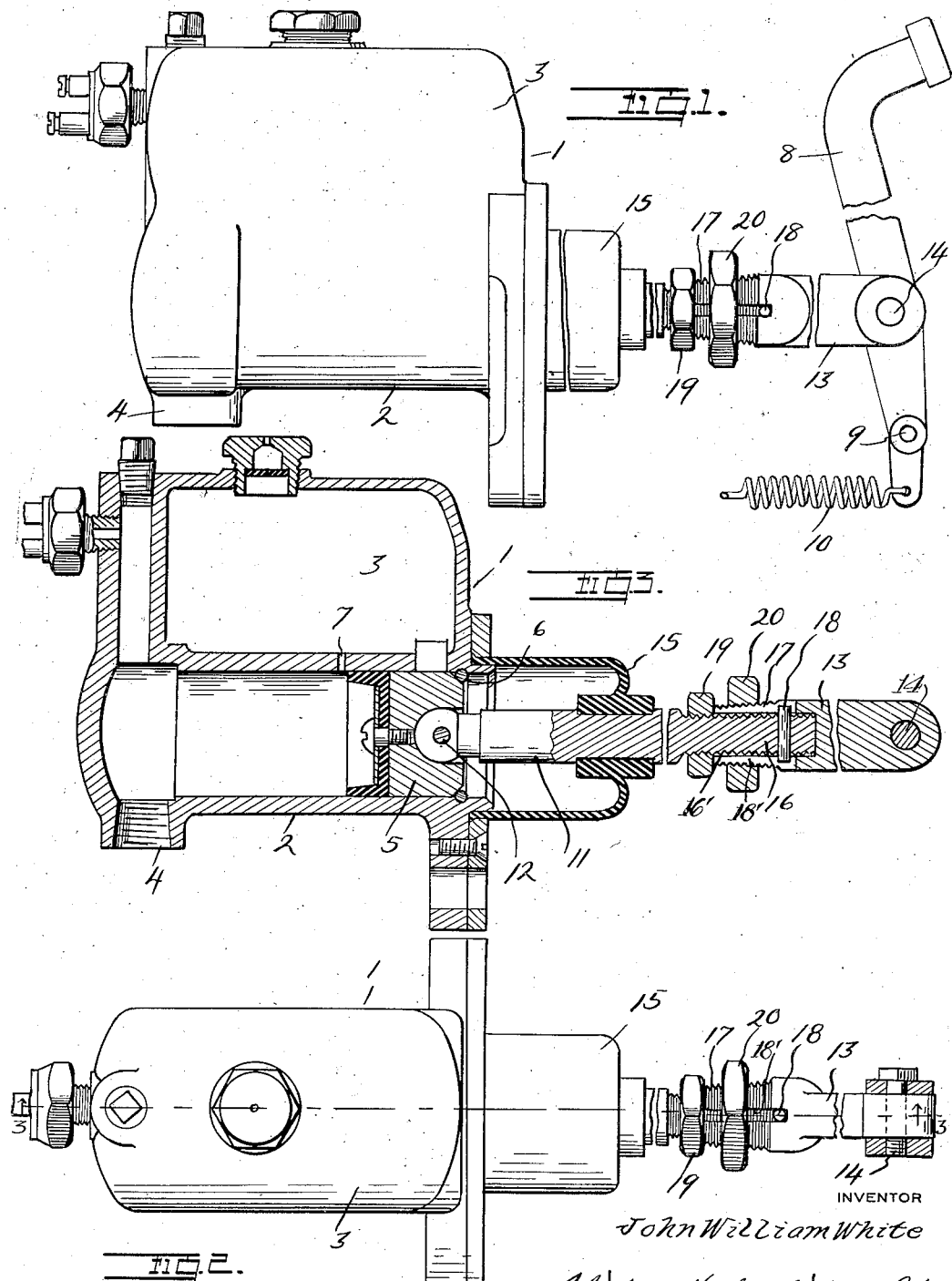
INVENTOR
John William White
ATTORNEYS

UNITED STATES PATENT OFFICE 2,050,682

BRAKE ACTUATING MECHANISM

John William White, Detroit, Mich., assignor, by mesne assignments, to General Motors Corporation, a corporation of Delaware Application July 30, 1934, Serial No. 737,651

6 Claims. (Cl. 188—196)

The invention relates to brake actuating mechanism and refers more particularly to the hydraulic type of brake actuating mechanism.

The invention has for one of its objects to provide an improved connection between the piston of the master cylinder and the brake lever. Another object is to so form the connection that it may be adjusted to properly position the brake lever in its off position. A further object is to provide means for holding from rotation about its axis the rod which is connected to the piston so that damage to either the connection between the rod and the piston or the sealing boot between the rod and the casing is avoided.

These and other objects of the invention will become apparent from the following description, taken in connection with the accompanying drawing, in which Figure 1 is a side elevation of a brake actuating mechanism showing an embodiment of my invention.

Figure 2 is a plan view thereof;

Figure 3 is a cross section on the line 3—3 of Figure 2.

The brake actuating mechanism is of the hydraulic type and comprises the casing 1 having the master cylinder 2 and the reservoir 3. The outlet 4 of the master cylinder is connected by the usual pipe to the brake actuators or wheel cylinders. 5 is the piston slidable within the master cylinder and 6 is the stop in the nature of a split ring secured in the casing and engageable with the piston to limit its retractile movement. The master cylinder 2 is adapted to communicate with the reservoir 3 through the restricted port 7 when the piston is in its retracted position.

8 is the brake lever which, as shown, is the brake pedal pivotally connected to the chassis frame of the motor vehicle by the horizontal pin 9 and 10 is the retracting coil spring connected at one end to the chassis frame and at the other end to the brake lever below its pivot to hold the latter in its normal or off position. This brake lever is positively connected to the piston 5 so that the retracting spring also serves to retract the piston. The connection between the brake lever and the piston comprises the rod 11 which is pivotally connected at one end by the horizontal pin 12 to the piston. The connection also comprises the clevis 13 which is pivotally connected at one end by the horizontal pin 14 to the brake lever above its pivot. The rod and the clevis are connected to each other. In operation, it will be seen that the brake lever swings through a vertical path as does also the rod between the brake lever and the piston. To provide for this movement and at the same time seal the casing there is the flexible boot 15 which is preferably formed of rubber and which encircles and is secured to the rod 11 and has a sealing engagement with this rod and also with the casing 1.

To properly position the brake lever 8 relative to the floor boards of the motor vehicle when this brake lever is in its off position and the piston 5 is in its retracted position and engaging the stop 6, the rod 11 and the clevis 13 are adjustably connected to each other. At the same time they are connected together in a manner which prevents the rod 11 from rotating about its axis so that damaging of the pivot pin 12 or the boot 15 or both is avoided. In detail, the rod 11 has the end portion 16 which extends into the socket formed by the tongues 17 integral with and at one end of the clevis 13. These tongues practically form a tapered outer face of circular cross section, and are preferably formed by longitudinally slotting the end of the clevis and furthermore these tongues are tapered and have increasing thickness from the free ends toward their other ends. The outer faces or peripheries of these tongues are threaded. The end portion 16 of the rod 11 is round and externally threaded and the threads or serrations 16' are hardened. 18 is a pin extending through the end portion 16 and preferably having a drive fit therewith, the length of the pin being such that its end portions extend into the slots 18' between the tongues 17 so that the rod 11 is held from rotation about its axis relative to the clevis 13. 19 is a nut threaded upon the end portion 16 and abutting the ends of the tongue 17, and 20 is a second nut having tapered internal threads corresponding to the taper of the external threads of the tongues 17. The arrangement is such that by threading the nut 20 upon the tongues, the tongues are forced radially inwardly to firmly engage the end portion 16. Since the external threads upon this end portion are hardened, they bite into the inner faces of the tongues and serve to more firmly connect the rod 11 and the clevis 13.

In assembling, with the piston 5 in its retracted position and in engagement with the stop 6 and the brake lever in its forward position, the nut 20 is tightened partially upon the tongues 17 and then the nut 19 is turned in a direction to force the rod 11 out of the tongues. This serves to swing the brake lever rearwardly and the turning of the nut 19 is carried on until the desired position of the brake lever relative to the foot boards is secured, after which the nut 20 is firmly tightened upon the tongues 17 to compel the serrations upon the end portion 16 to bite into the tongues, at which time the parts are all effectively connected together.

What I claim as my invention is:

1. In brake actuating mechanism, the combination with a master cylinder and a piston therewithin and a brake lever, of a rod operatively connected to said piston, a member connected to said brake lever, means engaging both rod and member holding said rod and member from rotation, and means for adjustably securing said rod and member together.

2. In brake actuating mechanism, the combination with a master cylinder and a piston therewithin and a brake lever, of a rod, a pin pivotally connecting said rod to said piston, a member, a pin pivotally connecting said member to said brake lever, means engaging both rod and member for maintaining said rod and member in predetermined angular relation to hold said pins substantially parallel, and means for adjustably securing said rod and member together.

3. In brake actuating mechanism, the combination with a master cylinder, a piston therewithin and a stop for limiting the retractile movement of said piston and a brake lever pivotally mounted to swing through a vertical path, of a rod operatively connected to said piston, a member connected to said brake lever, means engaging both rod and member holding said rod and member from rotation, and means for adjustably securing said rod and member together to secure proper positioning of said brake lever when said piston engages said stop.

4. In brake actuating mechanism, the combination with a master cylinder, a piston therewithin and a stop for limiting the retractile movement of said piston, a brake pedal pivotally connected to swing through a vertical path, and a spring for normally maintaining said brake pedal in off position, of a rod pivotally connected to said piston to swing through a vertical path, said rod having an end portion provided with hardened serrations on its face, a clevis pivotally connected to said brake lever and provided with externally threaded tongue portions forming a socket for receiving said serrated portion of said rod, means upon said serrated portion of said rod extending between said tongue portions for holding said rod and clevis from relative rotation, and means threaded upon said tongue portions for clamping the same upon said serrated portion of said rod.

5. In brake actuating mechanism, the combination with a master cylinder and a piston therewithin and a brake lever, of a rod operatively connected to said piston and having an end portion provided with serrations on its face, a clevis connected to said brake lever and having tapered tongues providing a socket for receiving said end portion, said tongues being externally threaded, a pin upon said end portion extending between said tongues, an adjusting nut threaded upon said end portion and abutting said tongues, and a nut threaded upon said tongues for clamping the same upon said end portion.

6. In brake actuating mechanism, the combination of a casing having a master cylinder, a piston within said master cylinder, a rod pivotally connected to said piston, a sealing boot encircling and secured to said rod and having sealing engagement therewith and with said casing, a pivotal brake pedal, a clevis pivotally connected to said brake pedal, cooperating means engaging said rod and clevis for holding the same from relative rotation, and means for adjustably securing said rod and clevis together.

JOHN WILLIAM WHITE.